(12) United States Patent
Hell et al.

(10) Patent No.: US 6,262,423 B1
(45) Date of Patent: Jul. 17, 2001

(54) SCANNING MICROSCOPE IN WHICH A SAMPLE IS SIMULTANEOUSLY AND OPTICALLY EXCITED AT VARIOUS POINTS

(75) Inventors: Stefan Hell, Heidelberg; Jörg Bewersdorf, Aalen; Rainer Pick, Göttingen, all of (DE)

(73) Assignee: Max-Planck-Gesellschaft zur Forderung der Wissenschaften e. V., Berlin (DE)

( * ) Notice: Subject to any disclaimer, the term of this patent is extended or adjusted under 35 U.S.C. 154(b) by 0 days.

(21) Appl. No.: 09/125,484
(22) PCT Filed: Dec. 22, 1997
(86) PCT No.: PCT/EP97/07250
§ 371 Date: Aug. 18, 1998
§ 102(e) Date: Aug. 18, 1998
(87) PCT Pub. No.: WO98/28775
PCT Pub. Date: Jul. 2, 1998

(30) Foreign Application Priority Data

Dec. 22, 1996 (DE) .............................. 196 53 413

(51) Int. Cl.$^7$ ............................ H01J 37/00; G01N 21/39
(52) U.S. Cl. ..................................... 250/458.1; 250/461.1
(58) Field of Search ............................. 250/458.1, 459.1, 250/461.1, 461.2; 356/124, 239.2

(56) References Cited

U.S. PATENT DOCUMENTS 5,034,613   7/1991   Denk et al. ........................... 250/458
5,381,016 * 1/1995   Moriya .............................. 250/458.1

FOREIGN PATENT DOCUMENTS

| 4138020 | 4/1992 | (DE) . |
| 4040441 | 7/1992 | (DE) . |
| 4414940 | 11/1995 | (DE) . |
| WO98/28775 | 7/1998 | (WO) . |

OTHER PUBLICATIONS

Ichihara et al, "High–Speed Confocal Fluorescence . . . " Bioimages 4(2), pp. 57–62, Jun. 1996.*

* cited by examiner

Primary Examiner—Scott J. Sugarman
Assistant Examiner—Richard Hanig
(74) Attorney, Agent, or Firm—Womble Carlyle Sandridge & Rice

(57) ABSTRACT

An optical apparatus, especially a scanning microscope (1), wherein an expanded laser beam (2) is divided into several partial beams (4) by micro lenses (5) arranged next to one another. Each partial beam (4) is focused onto a focal point (11) by a common objective lens (7) to optically excite a sample (8). Fluorescent light emanating from the individual focal points (11) of the sample (8) is registered by a photo sensor (13) arranged behind the objective lens (7) as seen from the sample (8). Each photon of the fluorescent light coming from the sample (8) and being registered by the photo sensor (13) is excited by at least two photons of the laser beam (2).

11 Claims, 4 Drawing Sheets

SCANNING MICROSCOPE IN WHICH A SAMPLE IS SIMULTANEOUSLY AND OPTICALLY EXCITED AT VARIOUS POINTS

FIELD OF THE INVENTION

The invention relates to an optical apparatus, especially a scanning microscope, wherein an expanded laser beam is divided into several partial beams by micro lenses arranged next to one another, wherein each partial beam is focused onto a focal point by a common objective lens to optically excite a sample, and wherein fluorescent light emanating from the individual focal points of the sample is registered by a photo sensor arranged behind the lens as seen from the sample.

BACKGROUND OF THE INVENTION

Typically, such an optical apparatus includes a junction device for the beam path, for example a beam splitter. The junction device is located between the light source of the laser beam and the sample. Consequently, the fluorescence light emanating from the sample is deflected laterally away from the direction of the excited laser beam and towards the photo sensor.

A scanning microscope is known from Nature, Vol. 183, page 760. Several partial beams are formed from an expanded laser beam. The partial beams are focused by a common objective lens to optically excite a sample. A photo sensor arranged behind the objective lens, as seen from the sample, registers fluorescence light of the focal points which emanates from the sample. Several partial beams are formed from the laser beam by a screen or an aperture arrangement having several holes. The screen or aperture arrangement is arranged in the optical path of the apparatus, so that the fluorescence light coming from the sample has to pass through the screen when it is to contact the photo sensor. Consequently, the apparatus is a confocal scanning microscope in which only fluorescence light coming from one plane of the sample contacts the photo sensor. Thus, a three-dimensional resolution of the sample with respect to the attained fluorescence light intensities is possible. The screen or aperture arrangement of the scanning microscope is a so-called "Nipkow disc" having holes arranged therein to scan the sample uniformly by rotating the "Nipkow disk" about its center. The "Nipkow disk" was originally designed to scan pictures to attain a signal to be send by telegraph.

A problem of the known scanning microscope is that the holes of the blind must have a certain minimum lateral distance between one another to prevent fluorescence light emanating from a plane of the sample other than the plane to be observed and not being focused back to the origin hole of the exciting radiation from passing through holes adjacent to the origin hole and onto the photo sensor. A great distance between the holes within the blind results in the luminous power of the laser beam substantially fading out due to the aperture arrangement and consequently not being used. Additionally, the laser light faded out by the aperture arrangement is reflected onto the photo sensor from the rear side of the aperture arrangement and causes great background.

To solve this problem, it is suggested in Nature, Vol. 338, pages 804 through 806, to arrange the holes of the aperture arrangement especially close to one another, knowing that light unfocused with respect to the origin hole passes through adjacent holes of the aperture arrangement and onto the photo sensor. The light resulting from the background is to be compensated by considering a light intensity distribution recorded by a photo sensor prior to the compensation and without making use of the aperture arrangement. After that, the light intensity distribution recorded without the aperture arrangement is subtracted from light intensity distribution recorded using the aperture arrangement. This procedure may cause difficulty since the background to be subtracted may have a greater dimension than the signal to be observed. Consequently, extreme defects may occur in the revised signal.

A scanning microscope is known from U.S. Pat. No. 5,034,613. Fluorescence light of the sample is registered by the photo sensor. The fluorescence light has a wavelength which is half as long as the wavelength of the laser beam. The fluorescence of the sample is based on a two photons excitation. The probability of such a two photons excitation differs substantially from zero exclusively in the core region of each focal point in which the laser beam is focused for optical excitation of the sample. Thus, the scanning microscope has a substantially improved axial resolution compared to confocal scanning microscopes. Nevertheless, the yields of fluorescence light of the sample are relatively smaller compared to a confocal scanning microscope. Thus, measuring times necessary for each sample to attain meaningful fluorescence light intensities are increased. The scanning of a sample in all three dimensions takes a much longer period of time compared to a confocal scanning microscope. Furthermore, the laser beam of the known scanning microscope making use of the two photons excitation is only focused in one focal point to excite the sample. The yield of fluorescence light of this focal point can be increased by increasing the luminous power of the laser beam. However, the possibility of increasing the luminous power of the laser beam is strictly limited since otherwise a local change of the sample occurs due to overheating.

From the German Patent Application 40 40 441 another scanning microscope is known. A laser beam is divided into two portions, and the two portions coming from opposite directions are brought to interference in a common focal point to excite a sample. With the interference, a main maximum and two secondary maxima of the light intensity occur in the region of the common focal point of the two partial beams. The main maximum has a smaller axial extension and is easily separable from the secondary maxima by a confocal arrangement. The small axial extension of the main maximum implies a very good axial resolution of this known scanning microscope.

A scanning microscope of the type mentioned at the beginning is known from Bioimages 4 (2): 57–62, June 1996. The micro lenses are arranged to form a micro lens wheel. The laser beam is divided into partial beams, and the sample is scanned in two dimension by rotating the micro lens wheel about its axis extending in parallel to the laser beam. A aperture wheel including one aperture opening for each micro lens is arranged behind the micro lens wheel. The partial beam directed onto the sample, as well as the fluorescence light excited by this partial beam and coming from the direction of the sample, enter through the aperture openings to attain a sufficient resolution in depth for this known scanning microscope using one photon excitation. The arrangement and the support of the micro lens wheel and of the aperture wheel have to be executed extremely accurate to assure a perfect function of the known scanning microscope. Since the micro lenses in the known micro lens wheel are not arranged side by side in two dimension, but in bent rows instead, as it is realized in a usual "Nipkow disk", not the entire light intensity of the expanded laser beam is used.

SUMMARY OF THE INVENTION

It is an object of the present invention to provide an optical apparatus, i.e. especially a scanning microscope, of the type mentioned at the beginning that makes it possible to use most of the luminous power of an expanded laser beam without the requirement of adjusting being great.

According to the present invention, this object is achieved by an optical apparatus, i.e. especially a scanning microscope, of the type mentioned at the beginning, in which each photon of the fluorescent light coming from the sample and being registered by the photo sensor is excited by at least two photons of the laser beam in the sense of a two-photons-process. This means that the novel apparatus makes use of a several photons excitation. Due to the excitation by several photons, a sufficient resolution with respect to depth is attained without having to use screens or apertures arranged behind the micro lenses and in front of the photo sensor.

The invention is applicable to all scanning microscopes using a several photon excitation to increase the axial resolution. That implies that the laser beam may also include laser radiation of various wavelengths. In this case, the wavelengths are differently related to the wavelength of the fluorescence light coming from the sample than it is described above. Usually, the wavelength of the fluorescence light is shorter than the shortest wavelength of the laser beam used for excitation.

For example, a scanning microscope according to the present invention may be characterized by the fact that the wavelength of the laser beam is approximately twice as long as the wavelength of the fluorescent light coming from the sample and being registered by the photo sensor. This fact corresponds to a two photons excitation of the fluorescence light or a two-photons-process. A variety of filters may be used to completely separate the fluorescence light from the laser radiation since the fluorescence light and the laser radiation have different wavelengths.

The micro lenses may be arranged directly adjacent to one another, so that the laser beam is used along its entire width. At the same time, no laser light is reflected by the micro lenses. The beam paths of the partial beams are easily separable after the micro lenses. The partial beams are focused in the focal points of the micro lenses. In this way, punctual light sources are realized in the focal points. By the objective lens, these punctual light sources are imaged into the plane of the sample to be observed. The punctual light sources have a lateral distance between one another corresponding to the diameter of the utilized micro lenses.

The micro lenses may have a common focal length and may be arranged in a plane oriented perpendicularly to the laser beam. Thus, the focal points of the micro lenses are also located in a common plane, and they are imaged into one plane of the sample. Due to the separation of the laser beam into several partial beams by the micro lenses, the scanning process of the sample is accelerated in this plane compared to the use of only one focal point in which the sample is excited.

The micro lenses may have different focal lengths and/or may be arranged in parallel planes oriented perpendicularly to the laser beam. Consequently, the focal points of the micro lenses have different axial position, and they are imaged into different planes of the samples. By scanning the sample, several planes of the sample are scanned at the same time.

The several micro lenses used in the novel apparatus are herein designated as a micro lens array. Such a micro lens array may be made of one piece by blank pressing. Typically, the micro lens array has an extend of several millimeters, for example 5 mm, in a perpendicular direction to the laser beam.

The micro lenses may be arranged side by side in one direction. This arrangement is advantageous when the laser beam has been expanded in only one direction by use of two bar-shaped lenses. In case of an arrangement of the micro lenses side by side in only one direction, the focal points are also provided to excite the sample in this arrangement.

To excite the sample simultaneously in a greater number of focal points, the micro lenses within the micro lens array may be arranged side by side in two directions. Such a two-dimensional micro lens array typically includes approximately 100 single micro lenses.

The micro lenses may be arranged to form a micro lens wheel, wherein the expanded laser beam is divided into the partial beams by some of the micro lenses, and wherein the sample is scanned in two or three dimensions by rotating the micro lens wheel about its axis extending in parallel to the laser beam. To scan the sample in three dimensions, the micro lenses of the micro lens wheel have to have different focal lengths, or have to be arranged in different distances to the sample.

It is not advantageous to also lead the fluorescence light coming from the sample back through the micro lens array to attain a strict confocal arrangement.

Other objects, features and advantageous of the present invention will come apparent to those skilled in the art upon review of the following specification, when taken in conjunction with the accompanying drawing. The fluorescence light should be deflected laterally outside the optical path and imaged onto a photo sensor. In case of the photo sensor being a CCD-array, an aperture arrangement or a screen can be simulated in front of the photo sensor by controlling the CCD-array, so that a confocal arrangement of the scanning microscope is achieved effectively, without the requirement of adjustment being as great as it is using a physical aperture arrangement.

The novel micro lens array may also be used with a scanning microscope in which the axial resolution is increased by interference of laser radiation coming from two directions. In this case, the laser beam divided into the partial beams by the micro lenses is divided by a beam dividing device, and the partial beams are brought to interference in the region of the sample from opposite directions. In each of the focal points into which a focal point of a micro lens is imaged, an interference maximum occurs in which the optical excitation is achieved.

The novel optical apparatus is not only advantageous in case of being used as a scanning microscope. Also, it can be used as a testing apparatus to test lenses and combinations of lenses. For the testing, the lenses are inserted into the apparatus as objective lenses. For example, the sample may consist of a fluid including a fluorescent material having a defined, homogeneous concentration. Thus, in case of a relative motion of the objective lens with respect to the micro lens array, a change of the fluorescence light intensities registered by the photo sensor must not occur, when the lens or the lens combination, respectively, does not have any defects.

The invention is explained and described in greater detail with respect to embodiments. In the following, it is always referenced to a scanning microscope, although the above described testing apparatus for lenses or lens combinations would have the identical arrangement.

DETAILED DESCRIPTION

Figure 1:
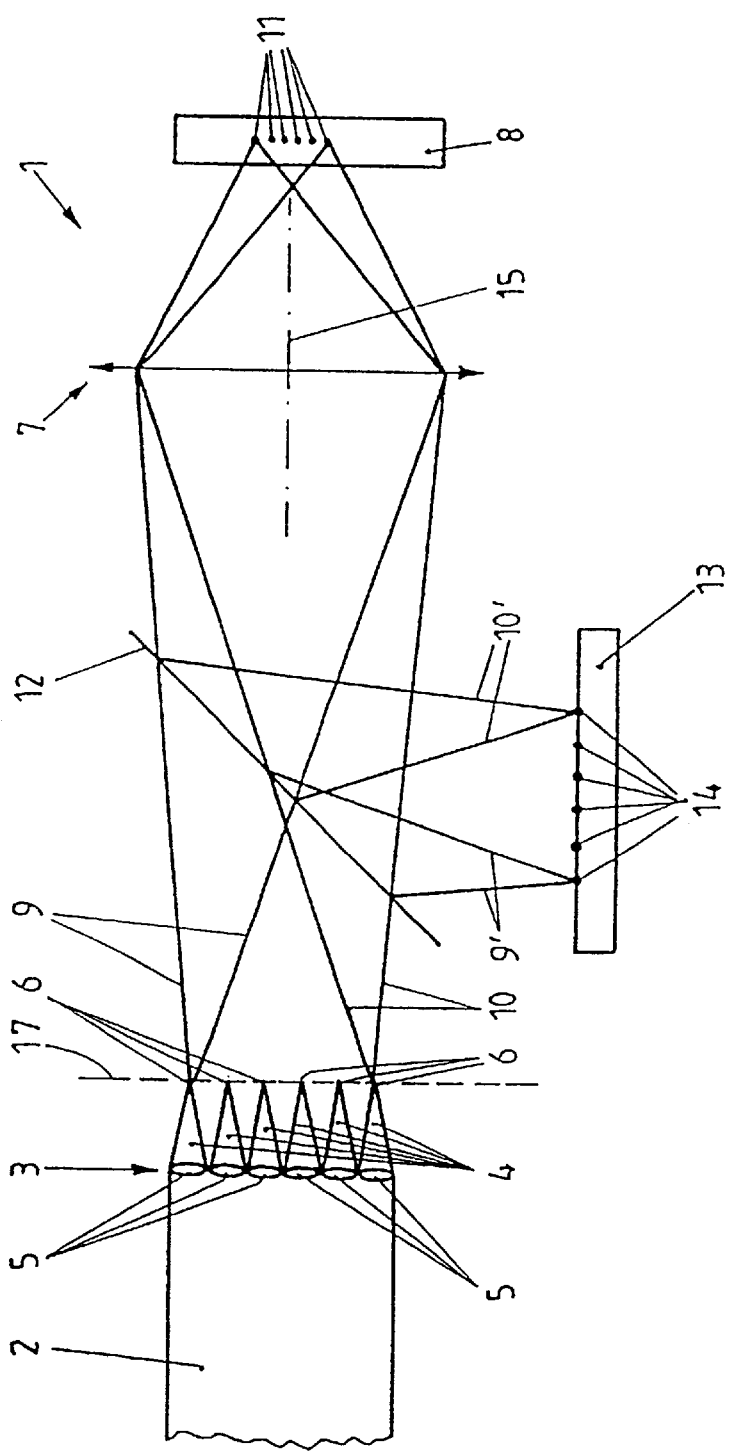
FIG. 1 illustrates the arrangement of a first embodiment of a scanning microscope according to the present invention.

FIG. 1 illustrates a scanning microscope 1. An expanded laser beam 2 coming from a laser and an expanding optical device (both not shown) is divided into several partial beams 4 by a micro lens array 3. The micro lens array 3 includes a multiplicity of micro lenses 5 arranged side by side. Each micro lens 5 focuses one partial beam 4 in its focal point 6. Each focal point 6 forms a punctual source of light which is imaged into a sample 8 by an objective lens 7. The image is illustrated by the beam paths 9 and 10 of the two outer partial beams 4. Each partial beam 4 is focused in a focal point 11, and in each focal point 11 the material of the sample 8 is optically excited to fluorescence. The fluorescence light passes through the objective lens 7, and by a tilted mirror 12 onto a photo sensor 13. To clearly illustrate the focal points 11 on the photo sensor 13, the beams paths of the two outer focal points 11 are shown and are designated with 9' and 10'. The images 14 of the focal points 11 on the photo sensor 13 have the same lateral distance between one another as the focal points 6 of the micro lenses 5. The entire laser beam 2 is used for the partial beams 4 with the micro lenses 5, so that at a given luminous power of the laser 2, the maximum optical excitation of the sample 8 occurs in the focal points 11. This is advantageous since a several photons excitation is observed to increase the axial resolution of the scanning microscope 1 in the direction of the optical axis 15 of the objective lens 7. The concentration of the fluorescence radiation onto the region around the geometric focal points 11 is great enough not to use a screen or an arrangement of apertures in front of the photo sensor 13, as it is necessary to confocal scanning microscopes to increase the axial resolution. Nevertheless, when an aperture arrangement is simulated by a software, by controlling the photo sensor 13 preferably being a CCD-array, the scanning microscope 1 according to FIG. 1 may also be used to observe a one photon excitation of the sample in the focal points 11.

Figure 2:
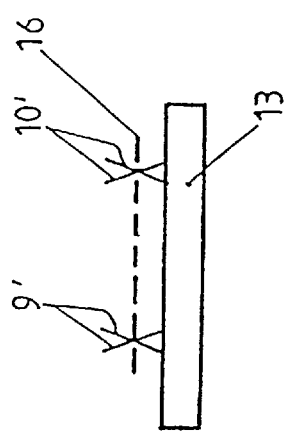
FIG. 2 illustrates a detail of a second embodiment of the scanning microscope according to the present invention.

FIG. 2 illustrates the arrangement of a blind 16 in front of the photo sensor 13 in another embodiment of the scanning microscope 1 according to FIG. 1.

Figure 3:
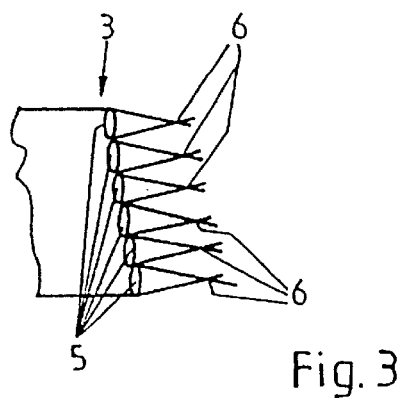
FIGS. 3–8 each are illustrations of embodiments of micro lens arrays used in combination with the scanning microscope according to the present invention.

The micro lenses 5 of the micro lens array 3 of the embodiment of the scanning microscope 1 illustrated in FIG. 1 are arranged in one common plane, and the micro lenses 5 all have the same focal length, so that the focal points 6 are located in one common plane 17. This is not true for the embodiments illustrated in FIGS. 3 and 4. According to FIG. 3, the micro lenses 5 of the micro lens array 3 are displaced axially with respect to one another. Since the micro lenses 5 have the same focal length, the focal points 6 are axially displaced with respect to one another by the same way as the micro lenses 5. Correspondingly, the focal points 6 are displayed in different planes of the sample 8. Thus, the sample 8 is excited in several adjacent planes when the micro lens array 3 according to FIG. 3 is used.

Figure 4:
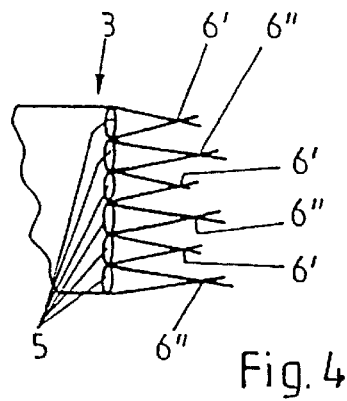

Such an excitation in several planes is also attainable by different focal lengths of the micro lenses 5 of the micro lens array 3, as this is illustrated in FIG. 4. One half of the micro lenses 5 has a shorter focal length than the other half of the micro lenses 5. The focal points 6' of the one half of the micro lenses 5 are located in a different plane than the focal points 6" of the other half of the micro lenses 5. Thus, the sample 8 is optically excited in two parallel planes.

While preferred embodiments of the invention have been disclosed in the foregoing specification, it is understood by those skilled in the art that variations and modifications thereof can be made without departing from the spirit and scope of the invention, as set forth in the following claims. Moreover, the corresponding structures, materials, acts, and equivalents of all means or step plus function elements in the claims are intended to include any structure, material, or acts for performing the functions in combination with other claimed elements, as specifically claimed herein.

Figure 5:
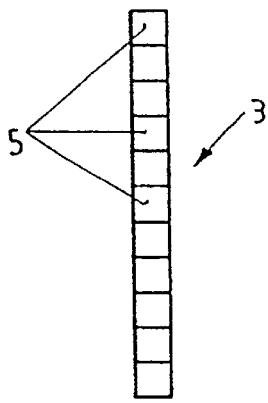
Figure 6:
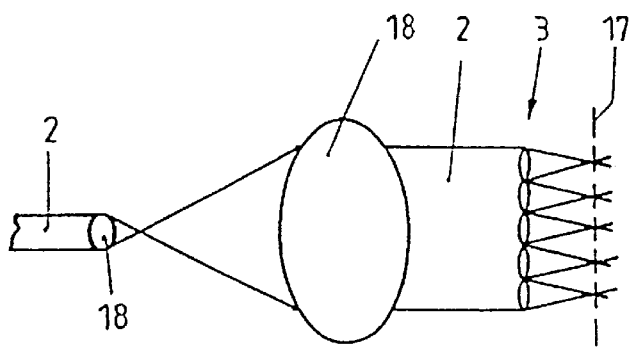

FIG. 5 shows a top view of a micro lens array 3 in which the micro lenses 5 are arranged side by side in only one direction and perpendicularly to the laser beam shining in from the direction of view. As illustrated in FIG. 6, such a micro lens array 3 is designed to expand a laser beam 2 in only one direction by means of bar-shaped lenses 18.

Figure 7:
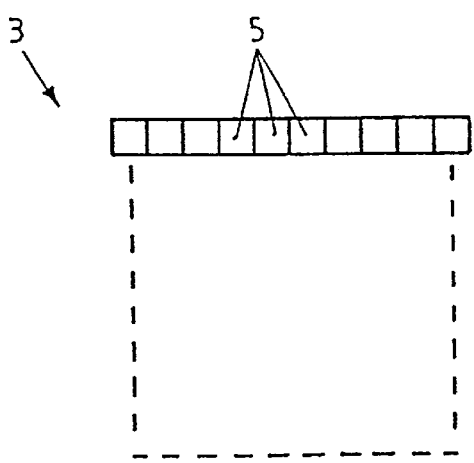
Figure 8:
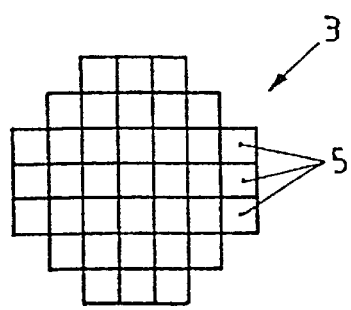

FIGS. 7 and 8 illustrate two embodiments of the micro lens array 3 in which the micro lenses 5 are arranged side by side in two directions. These micro lens arrays 3 are designed to accomplish a two-dimensional expansion of the laser beam 2. The shape of the micro lens array 3 according to FIG. 8 corresponds better to the cross section of a laser beam being usually circular than the rectangular shape of the micro lens array 3 of FIG. 7.

Figure 9:
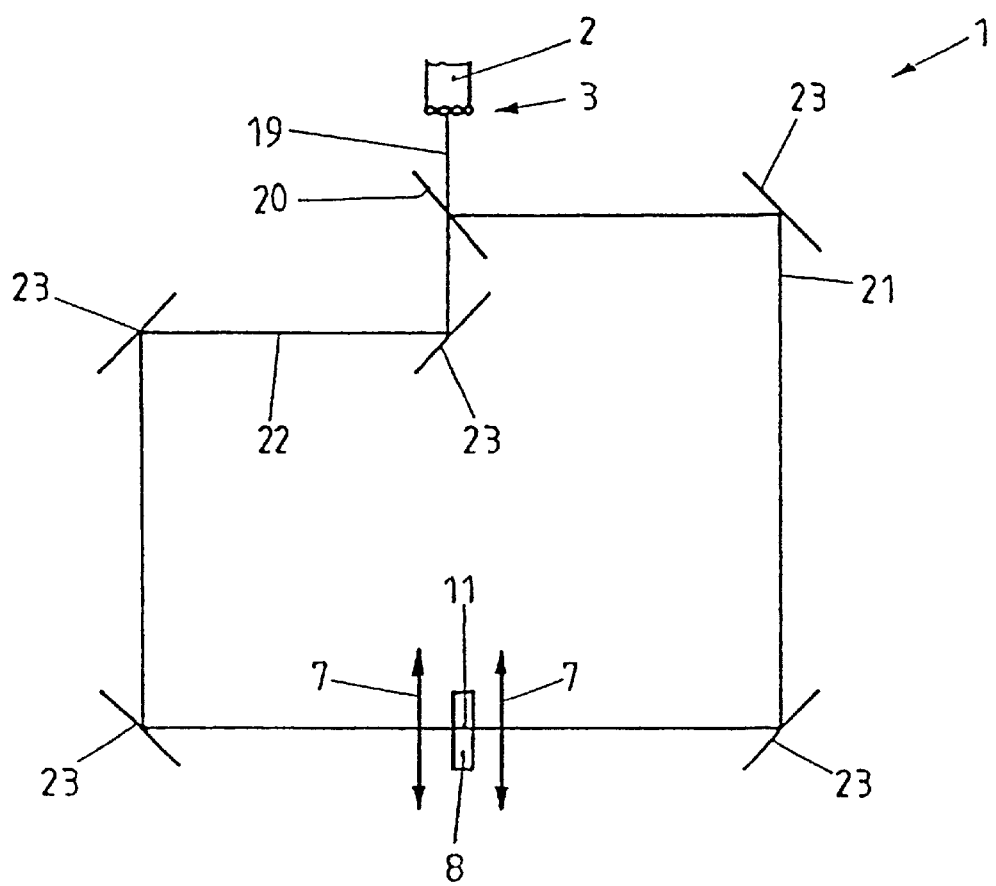
FIG. 9 illustrates a third embodiment of the scanning microscope according to the present invention.
Figure 10:
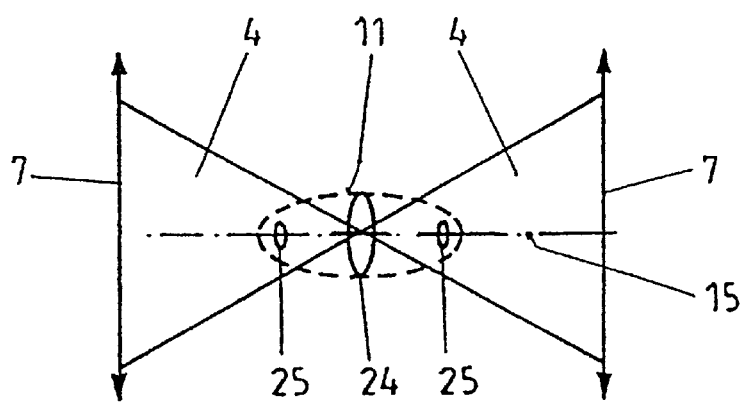
FIG. 10 illustrates an enlarged detail of the scanning microscope according FIG. 9.

FIG. 9 illustrates a scanning microscope 1. The expanded laser beam 2 is divided into several partial beams. These partial beams are not shown in detail. Only one beam path 19 is illustrated. After passing a beam separator 20, the beam path 19 is divided into two paths 21 and 22. The separated partial beams are lead in opposite directions to two objective lenses 7 via the two paths 21 and 22. The objective lenses superimpose the separated partial beams in the region of the sample 8. In case of the partial beams consisting of monochromatic, coherent light, an interference pattern including one main maximum and two secondary maxima in the region of the focal point 11 occurs for two partial beams 4, as it is illustrated in FIG. 10. The main maximum 24 and the secondary maxima 25 are spaced apart from each other in the direction of the optical axis 15 of the objective lenses 7, so that the fluorescence light can be discriminated by a confocal arrangement of a photo sensor, so that exclusively fluorescence light from the region of the main maximum is registered. When a several photons excitation is observed, this discrimination occurs automatically due to the different probabilities of excitation in the main maximum 24 and in the secondary maxima 25.

The invention to divide the laser beam 2 by a micro lens array 3 including a multiplicity of single micro lenses 5 is applicable to many different types of scanning microscopes. The entire light intensity of the laser beam 2 is always used. This is advantageous, when a several photons excitation is observed, since the likelihood of this excitation is much less than the likelihood of a single photon excitation.

Figure 11:
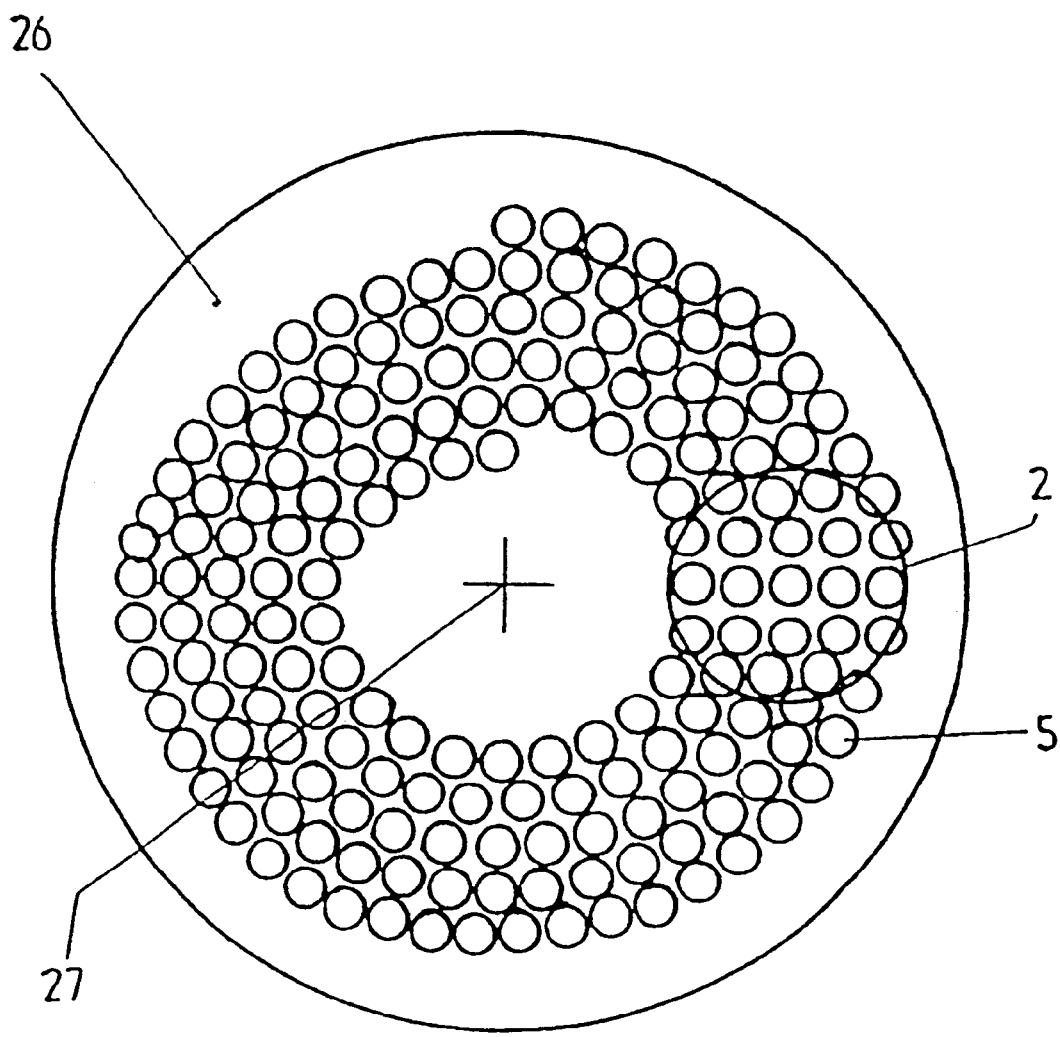
FIG. 11 is an illustration of another embodiment of a micro lens array used in combination with the scanning microscope according to the present invention.

The embodiment of the micro lens array shown in FIG. 11 suits to scan a sample with the focal points of the partial beams of the laser beam 2 in two dimensions or in three dimensions. The micro lenses 5 are arranged to form a micro lens wheel 26. Substantially, the entire expanded laser beam 2 is divided into partial beams by some of the micro lenses 5 arranged side by side in two dimensions, since only these micro lenses 5 are illuminated. By turning the micro lens wheel 26 about its axis 27 extending in parallel to the laser beam, the micro lenses 5 are moved with respect to the sample, and different lenses are used to divide the laser beam 2. As a result, the sample is scanned in two or three dimensions depending on whether the micro lenses 5 have one focal length and their focal points 6 are located in one plane as shown in FIG. 6, or whether they are displaced with respect to one another as illustrated in FIGS. 3 and 4. When the frequency of scanning the sample by the micro lens wheel 26 is high enough, the fluorescence light coming from the sample can be observed in the region of the photo sensor or via an additional eyeglass directly with the eye or as a picture. It is advantageous to use an IR-filter to exclude scattered excitation light. A frequency sufficient to directly observe the image with the eye is, for example, attained when the micro lenses 5 forming the micro lens wheel 26 cover the entire sample five times with each rotation of the micro lens wheel 26, and when the micro lens wheel 26 is rotated about its axis 27 with a frequency of 75 Hz. The direct observation of a sample during its several photons excitation was not possible prior to the invention due to the low fluorescence yield per time unit in the prior art.

What is claimed is:

1. An optical apparatus, wherein an expanded laser beam is divided into several partial beams by micro lenses arranged next to one another, wherein each partial beam is focused onto a focal point by a common objective lens to optically excite a sample, wherein fluorescent light emanating from the individual focal points of the sample is registered by a photo sensor arranged behind the objective lens as seen from the sample, and wherein each photon of the fluorescent light coming from the sample and being registered by the photo sensor is excited by at least two photons of the laser beam.

2. The apparatus of claim 1, wherein the wavelength of the laser beam is approximately twice as long as the wavelength of the fluorescent light coming from the sample and being registered by the photo sensor.

3. The apparatus of claim 1, wherein the micro lenses have a common focal length and are arranged in a plane oriented perpendicularly to the laser beam.

4. The apparatus of claim 1, wherein the micro lenses have different focal lengths and are arranged in parallel planes oriented perpendicularly to the laser beam.

5. The apparatus of claim 1, wherein the micro lenses are arranged side by side in one direction.

6. The apparatus of claim 1, wherein the micro lenses are arranged side by side in two directions.

7. The apparatus of claim 6, wherein the micro lenses are arranged to form a micro lens wheel, wherein the expanded laser beam is divided into the partial beams by some of the micro lenses, and wherein the sample is scanned in two dimensions by rotating the micro lens wheel about its axis extending in parallel to the laser beam.

8. The apparatus of claim 1, wherein the photo sensor is a CCD-array.

9. The apparatus of claim 1, wherein the laser beam divided into partial beams by the micro lenses is divided by a beam dividing device, and wherein the two divided partial beams coming from opposite directions are brought to interference in the region of the sample.

10. The apparatus of claim 6, wherein the micro lenses are arranged to form a micro lens wheel, wherein the expanded laser beam is divided into the partial beams by some of the micro lenses, and wherein the sample is scanned in three dimensions by rotating the micro lens wheel about its axis extending in parallel to the laser beam.

11. The apparatus of claim 1, wherein said common objective lens is a lens, a defect of which is to be determined, and wherein the sample comprises a fluorescent material having a defined, homogenous concentration.

* * * * *